(12) United States Patent
Ochiai et al.

(10) Patent No.: US 6,206,333 B1
(45) Date of Patent: Mar. 27, 2001

(54) MOTOR MOUNT FOR VEHICULAR SEAT APPARATUS

(75) Inventors: Takao Ochiai, Ashikaga; Yasushi Yoshida; Hideyuki Minami, both of Kiryu, all of (JP)

(73) Assignee: Mitsuba Corporation, Kiryu (JP)

( * ) Notice: Subject to any disclaimer, the term of this patent is extended or adjusted under 35 U.S.C. 154(b) by 0 days.

(21) Appl. No.: 09/368,928

(22) Filed: Aug. 5, 1999

(30) Foreign Application Priority Data

Aug. 19, 1998 (JP) .................................................. 10-232920

(51) Int. Cl.[7] .................................................. A63B 65/10
(52) U.S. Cl. ........................................... 248/424; 248/419
(58) Field of Search .................................. 248/424, 416, 248/418, 429; 310/91, 89

(56) References Cited

U.S. PATENT DOCUMENTS

| 4,448,381 | 5/1984 | Anspaugh et al. .................... 248/394 |
| 5,125,611 | 6/1992 | Cox ...................................... 248/429 |
| 5,216,929 | 6/1993 | Ochiai et al. .......................... 74/425 |
| 5,273,242 | 12/1993 | Mouri et al. ......................... 248/429 |
| 5,275,457 | 1/1994 | Satoh et al. ......................... 296/65.1 |
| 5,283,489 | 2/1994 | Ochiai et al. .......................... 310/71 |
| 5,292,164 | 3/1994 | Rees ..................................... 296/65.1 |
| 5,314,158 | 5/1994 | Mouri ................................... 248/429 |
| 5,370,443 | 12/1994 | Maruyama ......................... 297/284.1 |
| 5,427,345 | 6/1995 | Yamakami et al. .................. 248/394 |
| 5,738,327 | 4/1998 | Tanaka et al. ....................... 248/429 |
| 5,746,409 | 5/1998 | Rees ..................................... 248/422 |
| 5,762,309 | 6/1998 | Zhou et al. .......................... 248/429 |

*Primary Examiner*—Anita M. King
*Assistant Examiner*—N. Morrison
(74) *Attorney, Agent, or Firm*—Oliff & Berridge, PLC

(57) ABSTRACT

An electric motor, used for moving a seat of a vehicular seat apparatus, is mounted to mounting brackets so as not to produce vibration or unusual sounds. A cylindrical stepped portion projects from a bottom surface of a yoke of the electric motor. A fitting recess, formed in a frame member, is press-fitted over the yoke stepped portion such that the second frame member is checked from rotating relative to a motor armature shaft, but is allowed to move axially. The electric motor, including the second frame member, is disposed between a pair of first and second mounting brackets arranged in an opposed relationship in the axial direction of the electric motor. The electric motor is fixed by tightening screws into threaded holes formed in the frame member from an outer surface of the adjacent mounting bracket so that no gap is left between the frame member and the adjacent mounting bracket.

8 Claims, 3 Drawing Sheets

MOTOR MOUNT FOR VEHICULAR SEAT APPARATUS

BACKGROUND OF THE INVENTION

1. Field of Invention

The invention relates to the technical field of a vehicular seat apparatus which is mounted in a vehicle and is constructed to be capable of adjustment, e.g., adjusting the fore-and-aft position of a seat or the fore-and-aft position and the vertical height thereof.

2. Description of Related Art

Generally, some seat apparatuses mounted in vehicles are constructed such that the seat can be moved by, e.g., a fore-and-aft position adjusting means or a fore-and-aft position and vertical height adjusting means. Such a seat apparatus often employs an electric motor as a power source for moving the seat. In this case, an electric motor 11 is mounted, by way of example, as shown in FIGS. 3A and 3B. Frame members 13, 14 having extensions having threaded holes 13a, 14a formed therein are fixed to opposite axial ends of a yoke 12 of the electric motor 11 by caulking or any other fixing means. The electric motor 11 is disposed between a pair of mounting brackets 15, 16 which are arranged in an opposed relationship in the axial direction of a motor shaft 11a. The electric motor 11 is then secured by inserting screws 17 from respective outer surfaces of the mounting brackets 15, 16 and tightening the screws into the threaded holes 13a, 14a. With such a structure, the electric motor 11 can be firmly fixed in place with less vibration while both the motor axial ends are fixedly supported to the mounting brackets 15, 16.

The above-described related art however has problems as follows. Because the screws 17 are fastened to the frame members 13, 14 at the axial opposite ends of the electric motor 11 from the outer surfaces of the mounting brackets 15, 16 on both the axially spaced sides, the spacing between the mounting brackets 15, 16 must be in good match with the axial length (mounting dimension) of the electric motor 11 provided with the frame members 13, 14. Meanwhile, each component has a variation in product dimension which is inevitably caused during the manufacture process. Further, the frame members 13, 14 are fixed to the opposite ends of the electric motor 11 through fixing means as mentioned above. Particularly when the frame members 13, 14 are fixed by caulking, it is difficult to keep the mounting dimension of the electric motor 11 constant due to the inevitable variations in size produced by the caulking. If the spacing between the mounting brackets 15, 16 is not in match with the mounting dimension of the electric motor 11, gaps are left between outer end faces of the extensions having the threaded holes 13a, 14a formed in the frame members and inner surfaces of the mounting brackets 15, 16 when the electric motor 11 is fixed to the mounting brackets 15, 16 by the screws 17. The presence of such gaps produces vibration or unusual sounds upon driving of the electric motor 11. Moreover, if the frame members 13, 14 are fixed to the mounting brackets 15, 16 in a condition accompanying a dimensional error, there is a risk that the fixed portions are subjected to stresses (tensile forces) and durability of the fixed portions is deteriorated. In addition, when the frame members 13, 14 are fixed to the electric motor 11 by caulking, stresses are caused so as to act on not only the fixed portions but also the caulked portions, thus giving rise to a risk that the caulked portions may be broken. Those problems have been experienced in the technical field regarding the invention.

SUMMARY OF THE INVENTION

In view of the above-mentioned state of the art, the invention has been accomplished with the intent to solve the problems set forth above. For that purpose, the invention provides a vehicular seat apparatus in which an electric motor, serving as a power source for moving a seat, is disposed between a pair of mounting brackets arranged in opposed relation in the axial direction of a motor shaft, and the electric motor is fixed in place using screws inserted from respective outer surfaces of the mounting brackets, wherein at least one end of the electric motor is fixed to the mounting bracket through a frame member which is checked from rotating in the direction about the motor shaft, but is allowed to move axially.

The above feature avoids leaving a gap between the mounting bracket and the frame member and a seat apparatus can be provided which produces less vibration or unusual sounds upon driving of the electric motor.

In the above vehicular seat apparatus, the frame member may be fitted over the electric motor using a fitting force smaller than the fastening force developed when the frame member is fixed to the mounting bracket using screws. With this feature, the gap between the frame member and the mounting bracket can be automatically eliminated by fixedly screwing the frame member to the mounting bracket.

Further, in the above vehicular seat apparatus, the frame member may be fitted over the electric motor using a serrated or splined fitting.

DETAILED DESCRIPTION OF PREFERRED EMBODIMENTS

Figure 1:
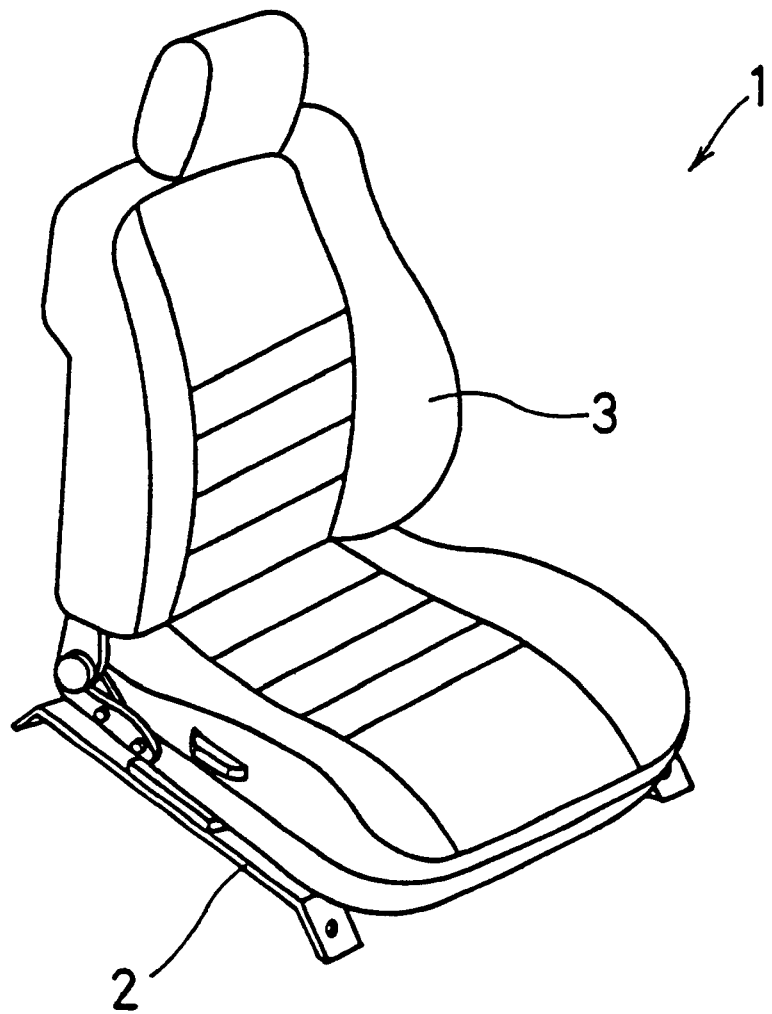
FIG. 1 is a schematic perspective view of a seat apparatus.
Figure 2A:
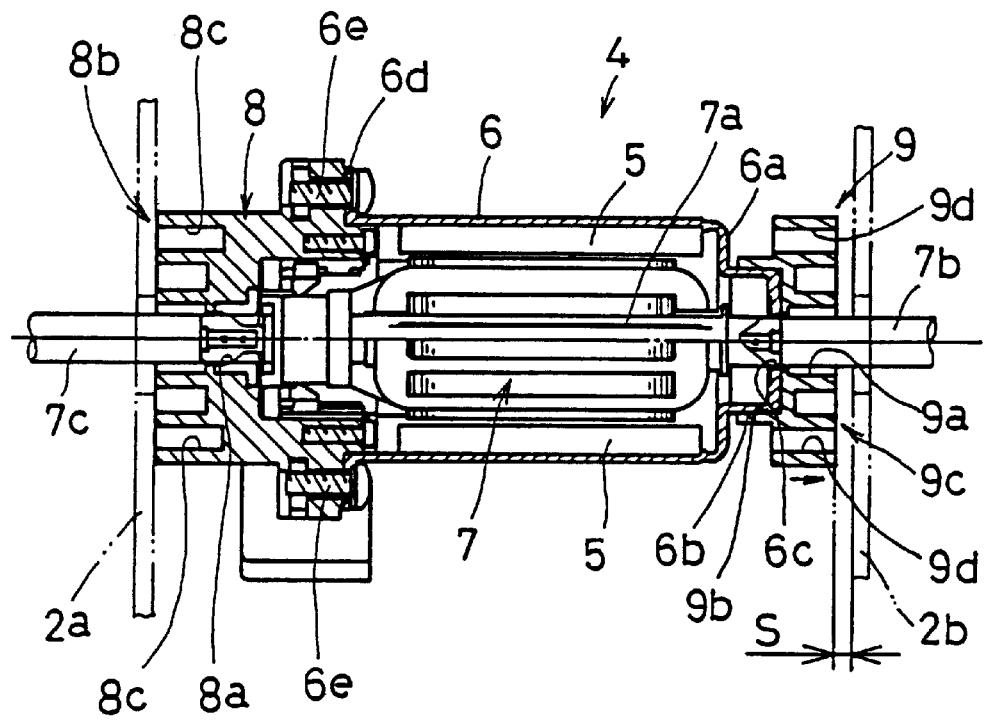
FIGS. 2A and 2B are plan views, partly sectioned, showing an electric motor in a mounted state.
Figure 2B:
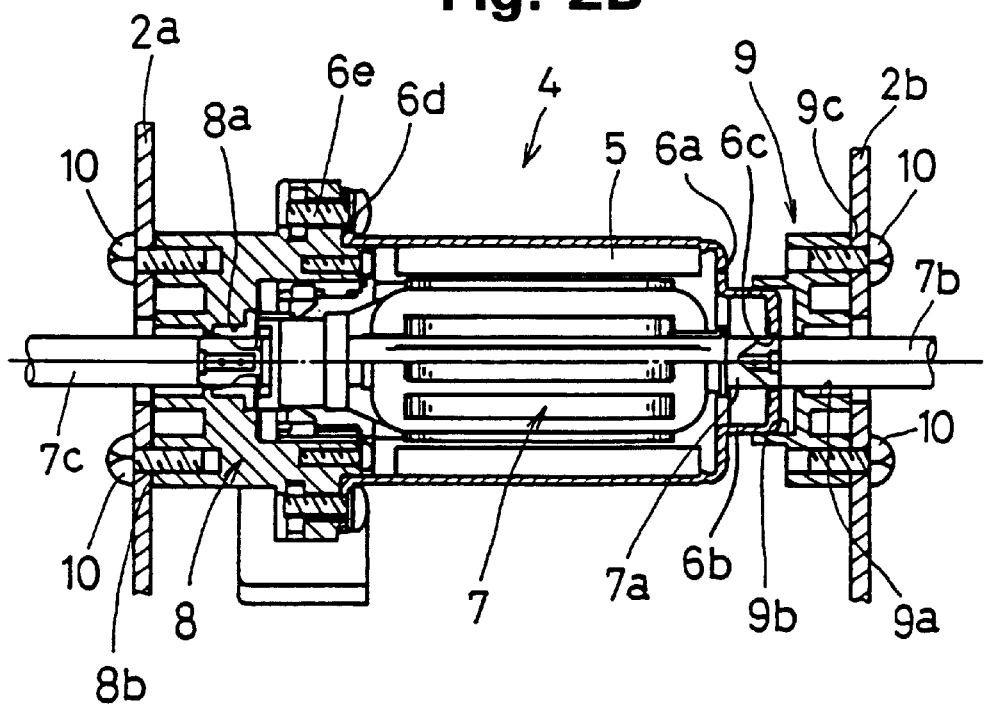
Figure 3A:
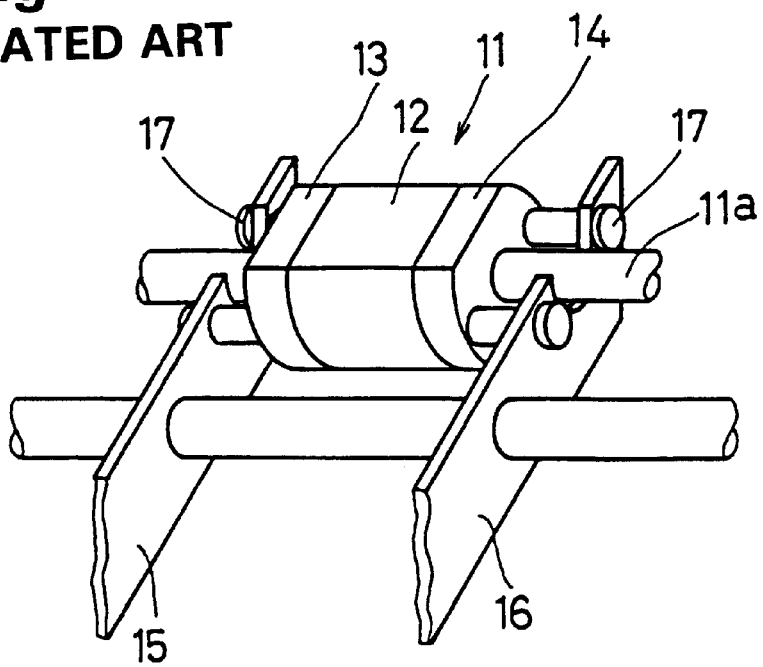
FIGS. 3A and 3B are respectively a perspective view and a plan view, partly sectioned, showing the related art.
Figure 3B:
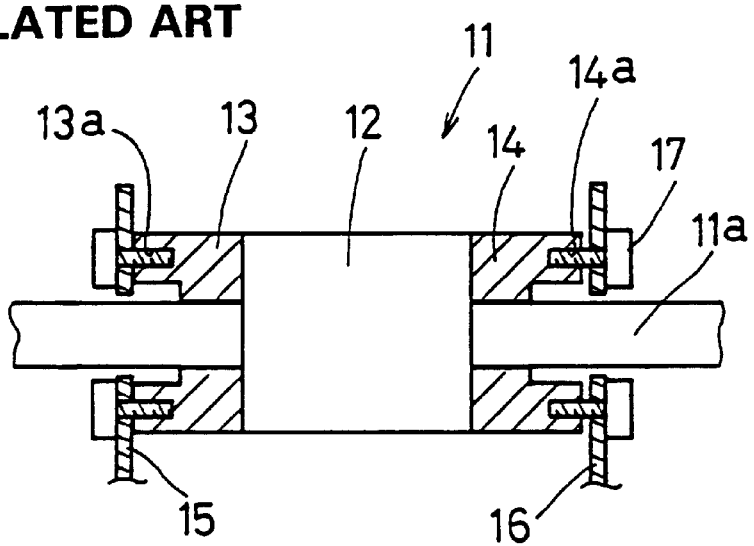

An embodiment of the invention will be described below with reference to FIGS. 1 through 2B of the accompanying drawings.

Referring to the drawings, numeral 1 denotes a seat apparatus mounted in a vehicle. The seat apparatus 1 comprises a seat mounting frame 2 fixed to the vehicular body side, a seat 3 supported by the seat mounting frame 2, and various seat operating mechanisms (seat moving means), not shown, such as a fore-and-aft position adjusting means for adjusting the fore-and-aft position of the seat 3 or a fore-and-aft position and vertical height adjusting means for adjusting the fore-and-aft position and the vertical height of the seat 3, the seat operating mechanism being interposed between the seat mounting frame 2 and the seat 3.

Numeral 4 denotes an electric motor serving as a power source for the seat operating mechanism. The electric motor 4 comprises a bottom-equipped cylindrical yoke 6 including permanent magnets 5 fixed to an inner peripheral surface thereof, and an armature 7 rotatably supported by the yoke 6. The yoke 6 has a predetermined degree of elasticity, and is provided at a bottom surface 6a with a cylindrical stepped portion 6b projecting outward. An armature shaft (motor shaft) 7a, comprising one component of the armature 7, has one end portion supported by a bearing hole 6c formed in the yoke stepped portion 6b, and a connecting shaft 7b is coupled to a tip of the one end portion of the armature shaft 7a for rotation therewith. The connecting shaft 7b projects from the yoke stepped portion 6b and is connected to the seat operating mechanism (not shown).

A flange 6d projecting radially outward is integrally formed at an open end of the cylindrical yoke 6. An outer peripheral edge of a first frame member 8 at one side is abutted with the flange 6d and is fixedly screwed to the same by screws 6e. The other end portion of the armature shaft 7a is rotatably supported by a bearing hole 8a formed in the first frame member 8, and a connecting shaft 7c is coupled to the tip of the other end portion of the armature shaft 7a for rotation therewith. The connecting shaft 7c projects from the first frame member 8 and is connected to the seat operating mechanism (not shown). Further, threaded holes 8c, each having threads formed in an inner peripheral surface thereof, are bored in the other side 8b of the first frame member 8 at two positions spaced in the circumferential direction.

A second frame member 9, is fitted over an outer periphery of the yoke stepped portion 6b. The second frame member 9 is made of a resin material having elasticity substantially equal to or lower than that of the yoke 6, and has a through hole 9a formed at the center thereof for allowing the connecting shaft 7b to pass through the through hole 9a. A fitting recess 9b, formed in the other side of the frame member 9, is press-fitted over the outer periphery of the yoke stepped portion 6b. With such a structure, the second frame member 9 is fitted to the yoke 6 such that it is checked from rotating in the direction about the armature shaft 7a, but is allowed to move axially (i.e., in a lightly press-fitted state). Axial movement of the second frame member 9 is allowed in an amount corresponding to an overlap distance by which the fitting recess 9b of the second frame member 9 is fitted over the yoke stepped portion 6b. Additionally, threaded holes 9d each having threads formed in an inner peripheral surface thereof are bored in one side 9c of the second frame member 9 at two positions spaced in the circumferential direction.

The electric motor 4 is mounted to the seat mounting frame 2 as follows. A pair of first and second brackets 2a, 2b are integrally formed on the seat mounting frame 2 so as to project in an opposed relationship to each other. The spacing between the first and second opposed brackets 2a, 2b is dimensioned to be substantially equal to the distance between the other side 8b of the first frame member 8 attached to the electric motor 4 and the one side 9c of the second frame member 9 (i.e., the mounting dimension of the electric motor). The electric motor 4 is disposed between the first and second brackets 2a, 2b in such a condition that an inner surface of the first bracket 2a is positioned close to the other side 8b of the first frame member 8 and an inner surface of the second bracket 2b is positioned close to the one side 9c of the second frame member 9. Then, screws 10 are inserted from an outer surface of the first bracket 2a and tightened (fastened) into the threaded holes 8c in the first frame member 8. Subsequently, other screws 10 are inserted from an outer surface of the second bracket 2b and are tightened into the threaded holes 9d in the second frame member 9. At this time, the second frame member 9 has elasticity substantially equal to or lower than that of the yoke 6 as mentioned above, and the fitting force by which the second frame member 9 is fitted over the yoke stepped portion 6b is set to be smaller than the fastening force developed between the second frame member 9 and the second mounting bracket 2b when the former is fixed to the latter by the screws 10. Therefore, even when there exists a gap S between the inner surface of the second mounting bracket 2b and the one side 9c of the second frame member 9 as shown in FIG. 2A, the gap S is eliminated. By inserting and tightening the screws 10 into the second frame threaded holes 9d, the fastening force developed between the second frame member 9 and the second mounting bracket 2b overcomes the fitting force by which the second frame member 9 is fitted over the yoke stepped portion 6b. Accordingly, as shown in FIG. 2B, the second frame member 9 is caused to move axially, i.e., toward the second mounting bracket 2b, within a range of the overlap distance between the second frame member 9 and the outer periphery of the yoke stepped portion 6b which are press-fitted, thereby eliminating the gap S.

In the embodiment of the invention thus structured, the first and second frame members 8, 9 are attached to the opposite ends of the electric motor 4 in the axial direction of the armature shaft 7a, and the electric motor 4 is mounted to the first and second mounting brackets 2a, 2b of the seat mounting frame 2 through the first and second frame members 8, 9. At that time, because the second frame member 9 is press-fitted over the outer periphery of the yoke stepped portion 6b through the fitting recess 9b in such a manner as able to move axially, the second frame member 9 can be moved toward the second mounting bracket 2b in an amount corresponding to the overlap distance between the two components. The axial movement of the second frame member 9 is made to the point to eliminate the gap S formed between the second frame member 9 and the second mounting bracket 2b. As a result, it is possible to prevent vibration or unusual sounds upon driving of the electric motor, and to improve the product quality.

With the seat apparatus in which the invention is implemented as described above, because the gap S left between the second frame member 9 and the second mounting bracket 2b can be eliminated, the following advantage is obtained. Even when there are errors between the mounting dimension of the electric motor 4 including the first and second frame members 8, 9 attached to it and the first and second mounting brackets 2a, 2b, the errors can be controlled substantially within a range of the overlap distance by which the second frame member 9 is axially press-fitted over the yoke stepped portion 6b. Accordingly, setting the axial dimension of the electric motor 4 and the separation of the first and second mounting brackets 2a, 2b with extremely high accuracy is no longer needed.

Further, because in the above embodiment the fitting force by which the second frame member 9 is fitted over the yoke stepped portion 6b is set to be smaller than the fastening force developed between the second frame member 9 and the second mounting bracket 2b when the former is fixed to the latter by the screws 10, the gap S is automatically eliminated by inserting (tightening) the screws 10 into the second frame threaded holes 9d from the outer surface of the second mounting bracket 2b, whereby the working efficiency is improved. In addition, forces (stresses) developed upon screwing of the second frame member 9 to the second mounting bracket 2b are prevented from acting to exert tensile forces on the screwed portions. A disadvantage of deteriorating the durability is therefore avoided.

It is to be noted that the invention is of course not limited to the above embodiment. For example, serrations, or splines, extending in the axial direction may be formed on the fitting areas between the second frame member and the outer periphery of the yoke stepped portion. In this case, the second frame member may be formed of a material which has elasticity higher than that of the yoke. Further, the outer periphery of the yoke stepped portion and the surface of the fitting area of the second frame member may be of a complementary triangular, square, or polygonal or an irregular shape that prevents relative rotation. In such a case, press fitting is unnecessary.

What is claimed is:

1. An electric motor mounting assembly for a vehicular seat apparatus in which an electric motor serves as a power source for moving a seat, the electric motor is disposed between a pair of mounting brackets arranged in opposed relation in the axial direction of a motor shaft, the mounting assembly comprising:

a first frame member attached at a first end of the electric motor to fix the electric motor to a first mounting bracket of the pair of mounting brackets;

a second frame member mounted to a second end of the electric motor, the second frame member fixed to the second mounting bracket of the pair of mounting brackets to be nonrotatable relative to the motor shaft but axially movable relative to the motor shaft.

2. The vehicular seat apparatus according to claim 1, wherein the frame member is fitted over an end of said electric motor by a fitting force smaller than the fastening force developed when the second frame member is fixed to the adjacent mounting bracket using screws.

3. The vehicular seat apparatus according to claim 1, wherein the second frame member is fitted to the electric motor by a serrated fitting.

4. The vehicular seat apparatus according to claim 2, wherein the second frame member is fitted to the electric motor by a serrated fitting.

5. An electric motor mount for an electric motor for a vehicle seat mounting and adjusting mechanism, comprising:

an opposed pair of mounting brackets mounted to a vehicular body side;

a first mounting frame member fixedly attached to a first end of a casing for the electric motor;

a second mounting frame member axially slidably, but non-rotatably, mounted to a projection extending from a second end of the casing for the electric motor, wherein the first mounting frame member is fixedly mounted to a first mounting bracket of the pair of mounting brackets and the second mounting frame member is fixedly attached to a second mounting bracket of the pair of mounting brackets.

6. The electric motor mount according to claim 5, wherein the projection is cylindrical and the second mounting member has a cylindrical opening that press fittingly receives the projection.

7. The electric motor mount according to claim 6, wherein the projection and the cylindrical opening have a complimentary serrated or splined configuration.

8. The electric motor mount according to claim 5, wherein the second mounting member has an opening having a triangular, square or polygonal shaped inner surface and an outer surface of the projection has a complementary shape.

* * * * *